US008375089B2

(12) United States Patent
Todorov

(10) Patent No.: US 8,375,089 B2
(45) Date of Patent: Feb. 12, 2013

(54) METHODS AND SYSTEMS FOR PROTECTING E-MAIL ADDRESSES IN PUBLICLY AVAILABLE NETWORK CONTENT

(75) Inventor: Aleksandar Lyubenov Todorov, Vratsa (BG)

(73) Assignee: Red Hat, Inc., Raleigh, NC (US)

( * ) Notice: Subject to any disclaimer, the term of this patent is extended or adjusted under 35 U.S.C. 154(b) by 306 days.

(21) Appl. No.: 12/128,128

(22) Filed: May 28, 2008

(65) Prior Publication Data

US 2009/0300206 A1  Dec. 3, 2009

(51) Int. Cl.
*G06F 15/16* (2006.01)
*G06F 7/04* (2006.01)
*G06F 17/21* (2006.01)
(52) U.S. Cl. ............... 709/206; 715/207; 726/26
(58) Field of Classification Search ............... 709/245, 709/206, 207; 707/10, 709; 715/530, 207; 726/26
See application file for complete search history.

(56) References Cited

U.S. PATENT DOCUMENTS

| 6,643,641 | B1 * | 11/2003 | Snyder .................. 707/709 |
| 6,938,170 | B1 * | 8/2005 | Kraft et al. .............. 726/23 |
| 6,944,822 | B1 * | 9/2005 | Schreiber et al. ......... 715/207 |
| 7,050,079 | B1 * | 5/2006 | Estrada et al. ........... 715/760 |
| 2004/0148358 | A1 * | 7/2004 | Singh et al. ............ 709/207 |
| 2005/0278626 | A1 * | 12/2005 | Malik .................. 715/530 |
| 2007/0282953 | A1 * | 12/2007 | Jain et al. .............. 709/206 |
| 2008/0215591 | A1 * | 9/2008 | Howard et al. ........... 707/10 |
| 2009/0144829 | A1 * | 6/2009 | Grigsby et al. ........... 726/26 |

* cited by examiner

*Primary Examiner* — Aaron Strange
(74) *Attorney, Agent, or Firm* — Lowenstein Sandler LLP

(57) ABSTRACT

A content server includes an e-mail masking module. The e-mail masking module is configured to replace text-based e-mail addresses, contained in content provided by the content server, with images of the e-mail addresses. The e-mail masking module can be a part of the content server. The e-mail masking module can be a standalone module capable of being installed into or operate in conjunction with the content server.

14 Claims, 4 Drawing Sheets

METHODS AND SYSTEMS FOR PROTECTING E-MAIL ADDRESSES IN PUBLICLY AVAILABLE NETWORK CONTENT

FIELD

This invention relates generally to products and services, more particularly, to systems and methods for network based products and services.

DESCRIPTION OF THE RELATED ART

The rise of the Internet has made information readily available and accessible to people around the world. People can openly and freely share information without the difficulties of the past. Unfortunately, the availability of information provides opportunities for malicious activity. E-mail spam bots collect e-mail addresses from the Internet in order to build mailing lists for sending unsolicited e-mail, also known as spam. A spam bot is a type of web crawler that can gather e-mail addresses from Web sites, newsgroups, special-interest group (SIG) postings, and chat-room conversations without the consent of the owners of the e-mail addresses. Because e-mail addresses are typically represented in text format and have a distinctive format, E-mail spam bots can scan the Internet, and easily identify and collect the e-mail addresses.

Typically, individuals or companies can protect personal information, such as e-mail addresses, included in their personal or corporate network sites. However, individuals or companies can not control the information included on third-party sites. Often, third parties will include an individual's e-mail addresses on sites out of the individual's control, for example a third party's blogs. Thus, there is a need in the art for systems and methods to globally and seamlessly protect e-mail addresses from malicious activities such as spam bots.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
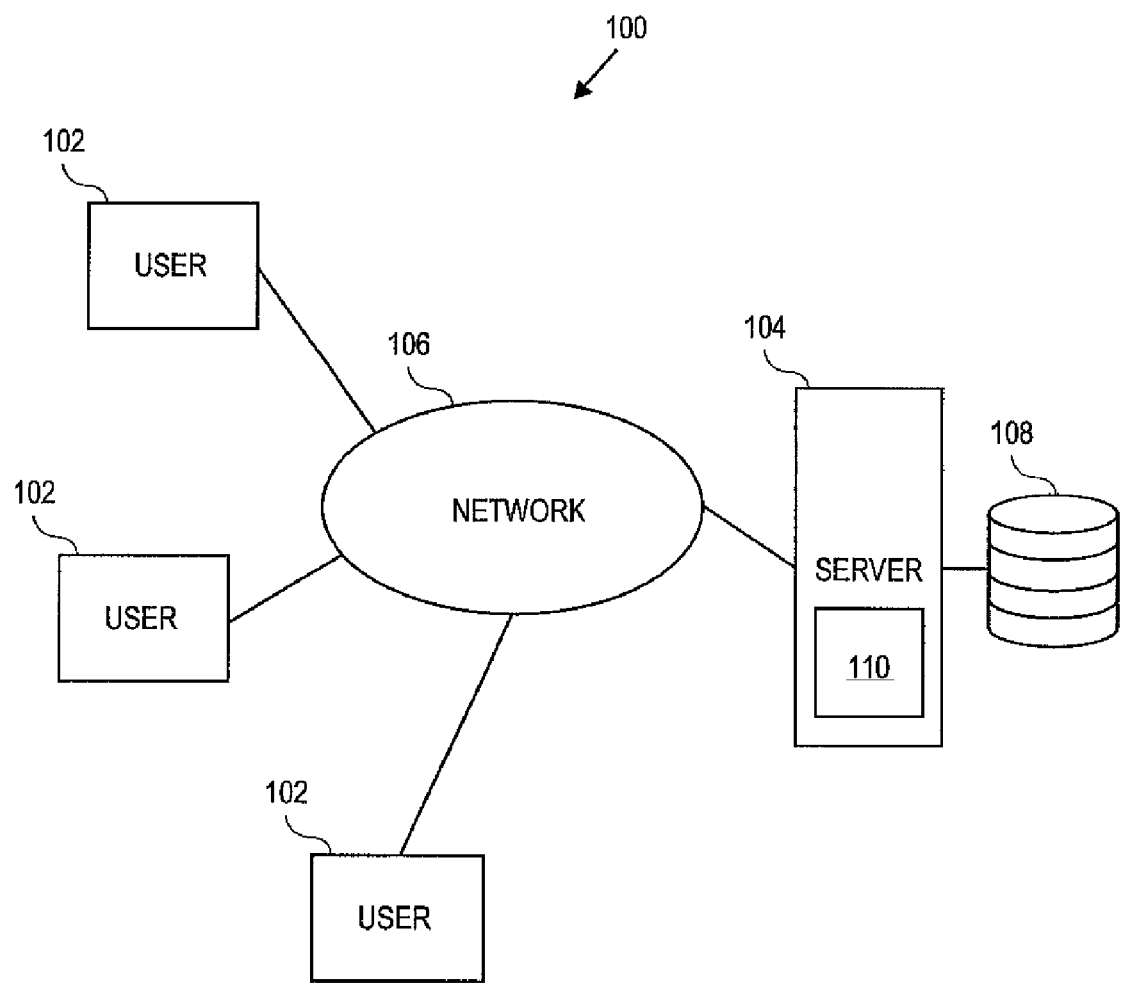
FIG. 1 illustrates an overall system architecture in which various embodiments of the present teachings can be practiced.

For simplicity and illustrative purposes, the principles of the present invention are described by referring mainly to exemplary embodiments thereof. However, one of ordinary skill in the art would readily recognize that the same principles are equally applicable to, and can be implemented in, all types of information and service portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present teachings relate to systems and methods for protecting e-mail addresses in publicly available network based content. More particularly, embodiments relate to platforms and techniques in which the e-mail addresses are protected by replacing the text-based e-mail addresses with images of the e-mail addresses.

According to embodiments, in general, a content server includes an e-mail masking module. The e-mail masking module is configured to replace text-based e-mail addresses, contained in the content provided by the content server, with images of the e-mail addresses. The e-mail masking module can be a part of the content server. Likewise, the e-mail masking module can be a standalone module capable of being installed into or operate in conjunction with the content server.

According to embodiments, the content server receives a request to provide content. The content can be any type of network based content available in network applications such as a web pages, chat session, web forums, blogs, and the like. The content server can be configured to retrieve the requested content from a repository, such as a database or a file system. Likewise, the content server can be configured to pass content from one user to another without storing the content in a repository. Once retrieved, the content server passes the content to the e-mail masking module. The e-mail masking module is configured to replace text-based e-mail addresses, contained in the content, with images of the e-mail addresses.

To locate e-mail addresses in the content, the e-mail masking module parses the content to identify the e-mail addresses. The e-mail masking module searches the retrieved content for a feature common to e-mail addresses, such as the "@" character.

To replace the located e-mail addresses with images of the e-mail addresses, the e-mail masking module can maintain a record of the images associated with an index for those e-mail addresses. The index can be a shortened representation of the e-mail address, for example a hash. Likewise, the e-mail masking module can generate the images each time they are requested, without maintaining a record of the images.

The e-mail masking module determines an index for the located e-mail addresses in the content. For example, the e-mail masking module can be configured to apply a hash function to the located e-mail addresses. The hashed e-mail address can represent the index for the e-mail address. Once an index has been determined for a located e-mail address, the e-mail masking module can be configured to search the record to find a stored index that matches the determined index. The e-mail masking module can then retrieve the image associated with the matching index for each located email address. If the e-mail masking module does not find a matching index, the e-mail masking module can create a new image and new index for the e-mail address and store the new image associated with the new index. Likewise, if the e-mail masking module does not maintain a record of images, the e-mail masking module can be configured to generate images without searching in a record.

Once the e-mail masking module has retrieved or generated the images for the located e-mail addresses in the retrieved content, the e-mail masking module can pass the retrieved images to the content server for replacement of the located text-based email addresses. Likewise, the e-mail masking module can be configured to replace the e-mail addresses with the images.

By replacing the text-based e-mail addresses with images, content can be provided that is secure from malicious programs such as spam bots. That is, most malicious programs that capture the email addresses utilize some method of text searching and parsing. The substituted images cannot be extracted by the spam bots, but are still viewable by users. Additionally, by including the e-mail masking module in the content server, e-mail addresses can be protected across different platforms or applications not under the control of particular individuals.

FIG. 1 illustrates an exemplary system 100 in accordance with an embodiment. It should be readily apparent to those of ordinary skill in the art that system 100 depicted in FIG. 1 represents a generalized schematic illustration and that other components may be added or existing components may be removed or modified. Moreover, system 100 may be implemented using software components, hardware components, or combinations thereof.

As shown in FIG. 1, system 100 includes users 102, a content server 104 and a network 106. The users 102 can be private individuals, employees of private business or public entities or other persons interested in accessing or receiving content provided by the content server 104. The users 102 can communicate with the content server 104 using personal computers, personal mobile devices, workstations or other networked computing platforms.

The network 106 can be a combination of wide area and local area networks such as the Internet. The network 106 can be configured to provide a communication channel between the users 102 and the content server 104. The network 106 can implement a variety of network protocols to provide the communication channel such as Internet Protocol ("IP") v4/v6, ATM, SONET, or other similar network protocols.

The content server 104 can be configured to provide content to users 102. The content server 104 can be any type of network system that provides an interface and provides content on request. For example, the content server 104 can be a blogging engine, content management system, forum engine, bug reporting system, mailing list server, web archive, or general web server. The content can be any type of network based content such as a web page, chat session, web forum, and the like.

The content server 104 can be coupled to a repository 108, such as a database or a file system. The repository 108 can be implemented in any type of storage medium and using any type of open-source or proprietary software. The repository 108 can be utilized to store the content provided by the content server 104. Likewise, the content server 104 can be configured to provide content between users 102 without storing the content in a repository.

The content server 104 can also be configured to include an e-mail masking module 110. The e-mail masking module 110 can be configured to replace text-based e-mail addresses, contained in the content provided by the content server, with images of the e-mail addresses. The e-mail masking module 110 can be a part of the content server 104. Likewise, the e-mail masking module 110 can be a standalone module capable of being installed into or operate in cooperation with the content server 104.

According to embodiments, the content server 104 passes the content to the e-mail masking module 110. The e-mail masking module 110 is configured to replace text-based e-mail addresses, contained in the content, with images of the e-mail addresses. To locate e-mail addresses in the content, the e-mail masking module 110 parses the content to identify the e-mail addresses. The e-mail masking module 110 searches the retrieved content for a feature common to e-mail addresses, such as the "@" character.

To replace the located e-mail addresses with images of the e-mail addresses, the e-mail masking module 110 can maintain a record of the images associated with an index for those e-mail addresses. The index can be a shortened representation of the e-mail address, for example a hash. The e-mail masking module 110 can maintain the record in repository 108.

The e-mail masking module 110 determines an index for the located e-mail addresses in the content. For example, the e-mail masking module 110 can be configured to apply a hash function to the located e-mail addresses. The hashed e-mail address can represent the index for the e-mail address. Once an index has been determined for a located e-mail address, the e-mail masking module 110 can be configured to search the record to find a stored index that matches the determined index. The e-mail masking module 110 can then retrieve the image associated with the matching index for each located email address. If the e-mail masking module 110 does not find a matching index, the e-mail masking module 110 can create a new image and new index for the e-mail address and store the new image associated with the new index in the record.

Likewise, the e-mail masking module can generate the images each time they are requested, without maintaining a record of the images. If the e-mail masking module does not maintain a record of images, the e-mail masking module can be configured to generate images without searching in a record.

Once the e-mail masking module 110 has retrieved or generated the images for the located e-mail addresses in the retrieved content, the e-mail masking module 110 can pass the retrieved images to the content server 104 for replacement of the located email address. Likewise, the e-mail masking module 100 can be configured to replace the e-mail addresses with the images.

Figure 2:
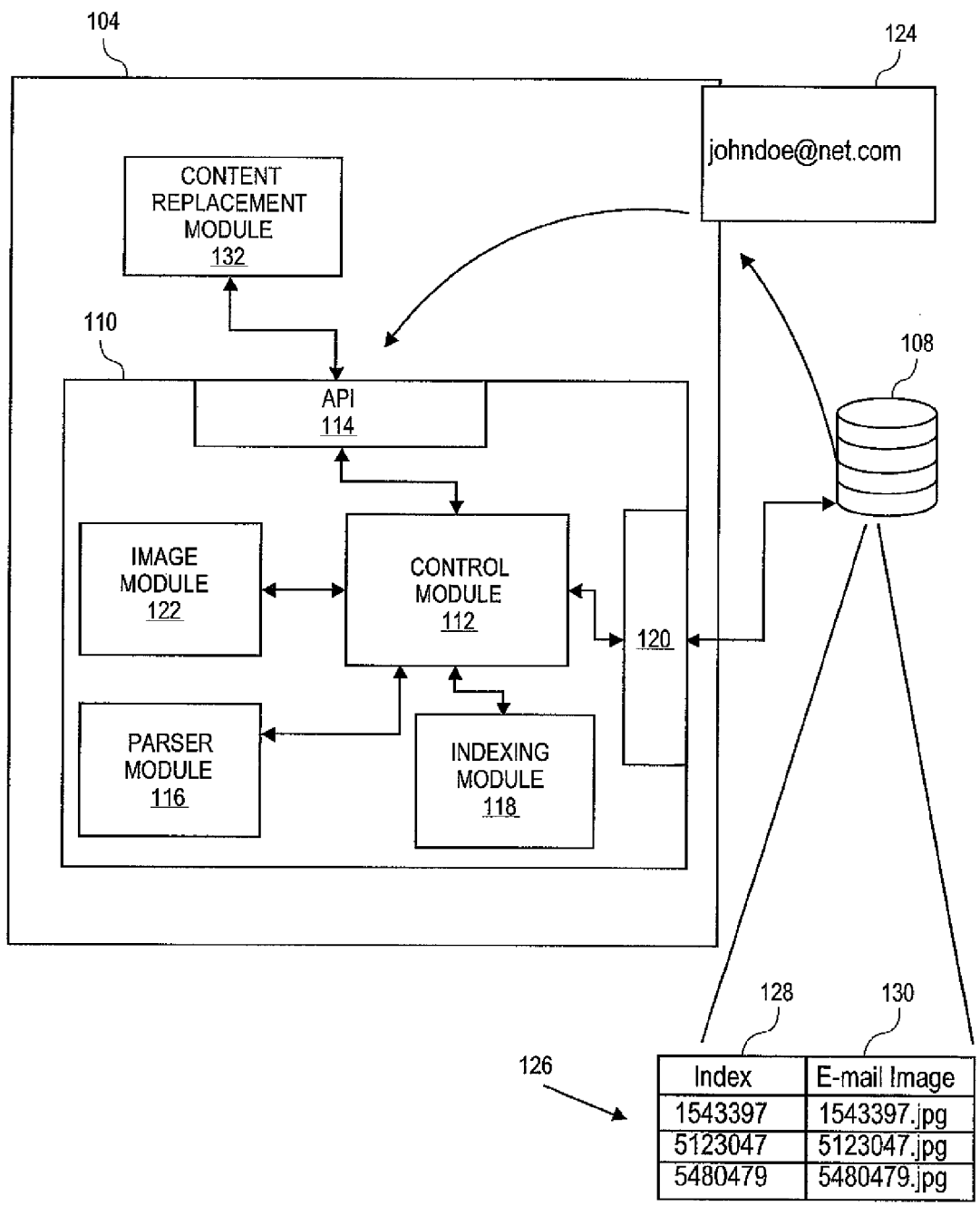
FIG. 2 illustrates an e-mail masking module, according to various embodiments.

FIG. 2 depicts a more detailed block diagram of the e-mail masking module 110 that can be included in content server 104 in accordance with embodiments. It should be readily apparent to those of ordinary skill in the art that the e-mail masking module 110 depicted in FIG. 2 represents a generalized schematic illustration and that other components may be added or existing components may be removed or modified.

As shown in FIG. 2, the e-mail masking module 110 can comprise a control module 112, an application programming interface ("API") 114, a parser module 116, an indexing module 118, a repository interface 120, and an image module 122. It should be readily obvious to one of ordinary skill in the art that the modules 112-122 can be implemented as software applications (programmed in C, C++, JAVA, PHP, etc.), hardware components (EEPROM, application specific integrated circuit, microprocessor, etc.) or combinations thereof.

Control module 112 can be configured to manage and interface with the other modules 114-122 to provide the functionality of the e-mail masking module 110 as described above and further described herein below.

To replace the e-mail addresses with images of the e-mail addresses, the e-mail masking module 110 can maintain a record 126 of the images associated with an index for those e-mail addresses. The index can be a shortened representation of the e-mail address, for example a hash. Record 126 can include an index field 128 for storing the indexes and e-mail image field 130 for storing the images. The images are a graphical representation of a text-based e-mail address. As such, the e-mail address contained in the image would still be viewable by a user, but could not be captured by a spam bot. The images of the e-mail addresses can be any type of image format such as JPEG, TIFF, Bit Map, GIFF, and the like.

The e-mail masking module 110 can maintain the record 126 in repository 108. As such, the control module 112 can be configured to communicate with repository 108 via the repository interface 120. One skilled in the art will realize that e-mail masking module 110 can maintain the record 126 in any storage medium including storage contained in the e-mail masking module 110 or the content server 104. Likewise, the record 126 can be a permanent or a temporary record depending on the configuration.

To provide content, the content server 104 receives a request to provide content. The content server 104 can be configured to retrieve the requested content 124 from a repository, such as a database or a file system. Likewise, the content server 104 can be configured to pass the content 124 from one user to another without storing the content 124 in a repository. The content 124 can include one or more e-mail address, such as "johndoe@net.com".

Once retrieved or received, the content server 104 passes the content to the e-mail masking module 110 via API 114. The e-mail masking module 110 is configured to replace e-mail addresses, contained in the content, with images of the e-mail addresses.

To locate e-mail addresses in the content 124, the control module 112 passes the content 124 to parser module 116. The parser module 116 parses the content 124 to identify the text-based e-mail addresses. The parser module 116 can be configured to search the content 124 for a feature common to e-mail addresses, such as the "1" character.

The e-mail masking module 110 determines an index for the located e-mail addresses in the content 124. As such, the control module 112 passes the located e-mail addresses to the indexing module 118. The indexing module can be configured to transform the e-mail addresses into a common and shortened index. For example, the indexing module 118 can be configured to apply a hash function to the located e-mail addresses. The hashed e-mail address can be the index for the e-mail address.

Once indexes have been determined for e-mail addresses, the e-mail masking module 110 can be configured to search the record 126 to find a stored index that matches the determined index. The control module 112 can retrieve the record 126 via interface 120. The control module 112 can then retrieve the image associated with the matching index for each located email address.

If the e-mail masking module 110 does not find a matching index, the e-mail masking module 110 can create a new image and new index for the e-mail address and store the new image associated with the new index. In particular, the control module 112 can pass the e-mail address to the image module 122 and indexing module 118. The image module 122 can be configured to create an image from the text based e-mail address. The control module 112 can store the new image and the new index created by the indexing module 118 in record 126.

Likewise, the e-mail masking module 110 can generate the images each time they are requested, without maintaining a record of the images. If the e-mail masking module does not maintain a record of images, the e-mail masking module 110 can be configured to pass the located e-mail addresses to the image module 122 to generate the images without searching in a record.

Once the e-mail masking module 110 has retrieved or generated the images for the located e-mail addresses in the content 124, the control module 112 can pass the retrieved images to the content server 104 for replacement of the located e-mail address. In particular, the content server 104 can include a content replacement module 132. The content replacement module 132 can be configured to modify the content 124. The content replacement module 132 can perform a substitution of the textual addresses with the images before the content 124 is sent to the user. While illustrated as part of content server 104, the content replacement module 132 can be incorporated in the e-mail masking module 110 and coupled to control module 112 in order to replace the e-mail addresses in the content 124 with the images.

While FIG. 2 illustrates the e-mail masking module 110 being part of the content server 104, the e-mail masking module 110 can be a standalone module capable of being installed into or operate in cooperation with the content server 104. Likewise, the e-mail masking module 110 can be a separate system capable of communicating with the users 102, the content server 104, and the repository 108.

Figure 3:
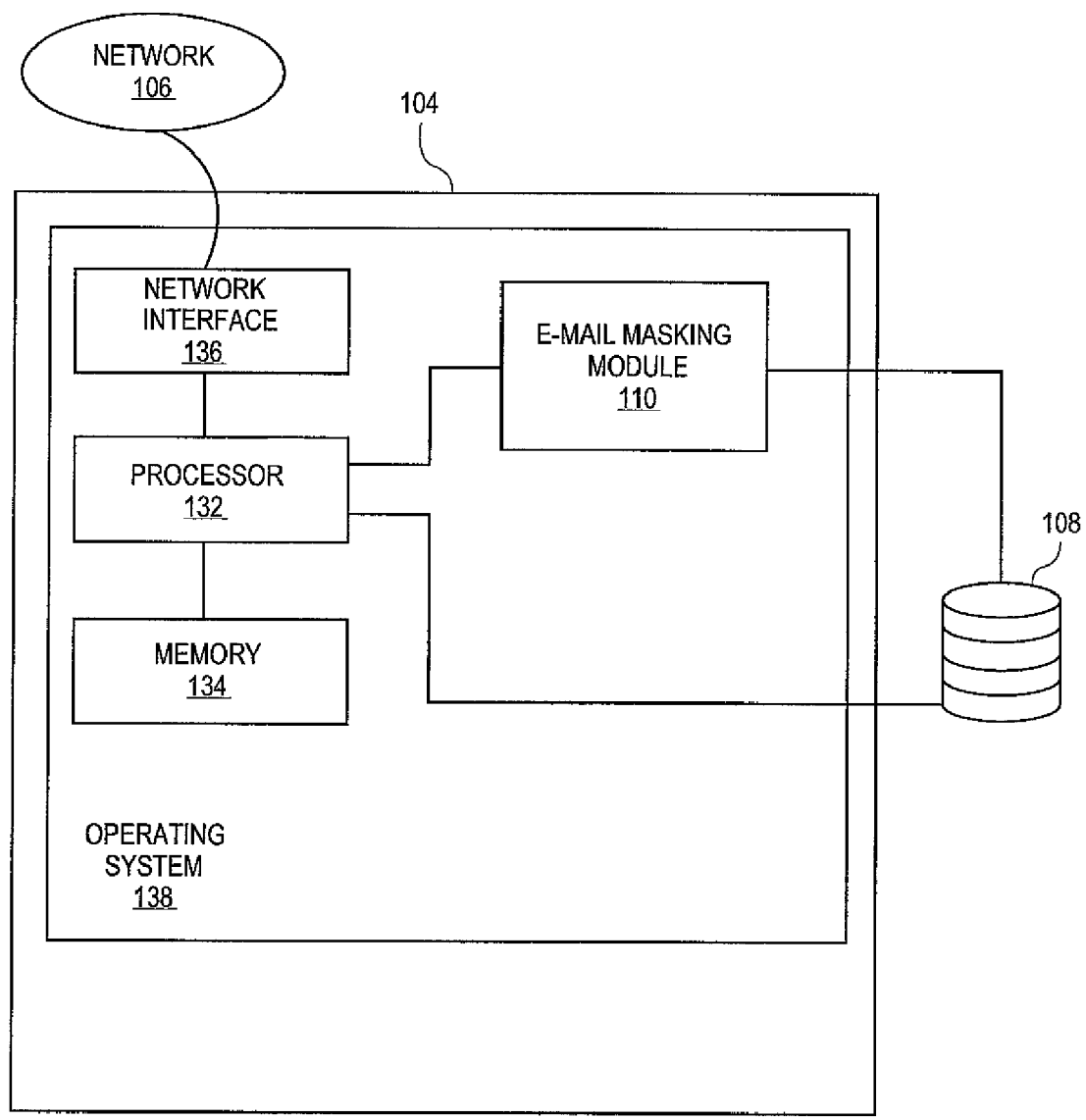
FIG. 3 illustrates an exemplary hardware configuration for a content server, according to various embodiments.

FIG. 3 illustrates an exemplary diagram of hardware and other resources that can be incorporated in the content server 104 that configured to include or cooperate with the e-mail masking module 110 and communicate with the user 102 via one or more networks 106, according to embodiments. In embodiments as shown, the content server 104 can comprise a processor 132 communicating with memory 134, such as electronic random access memory, operating under control of or in conjunction with operating system 138. Operating system 138 can be, for example, a distribution of the Linux™ operating system, the Unix™ operating system, or other open-source or proprietary operating system or platform. Processor 132 also communicates with repository 108, such as a database or a file system. Processor 132 further communicates with network interface 136, such as an Ethernet or wireless data connection, which in turn communicates with one or more networks 106, such as the Internet or other public or private networks. Processor 132 also communicates with e-mail masking module 110, to execute control logic and control the operation of e-mail masking process described above and below. Other configurations of the content server 104, associated network connections, and other hardware and software resources are possible.

Figure 4:
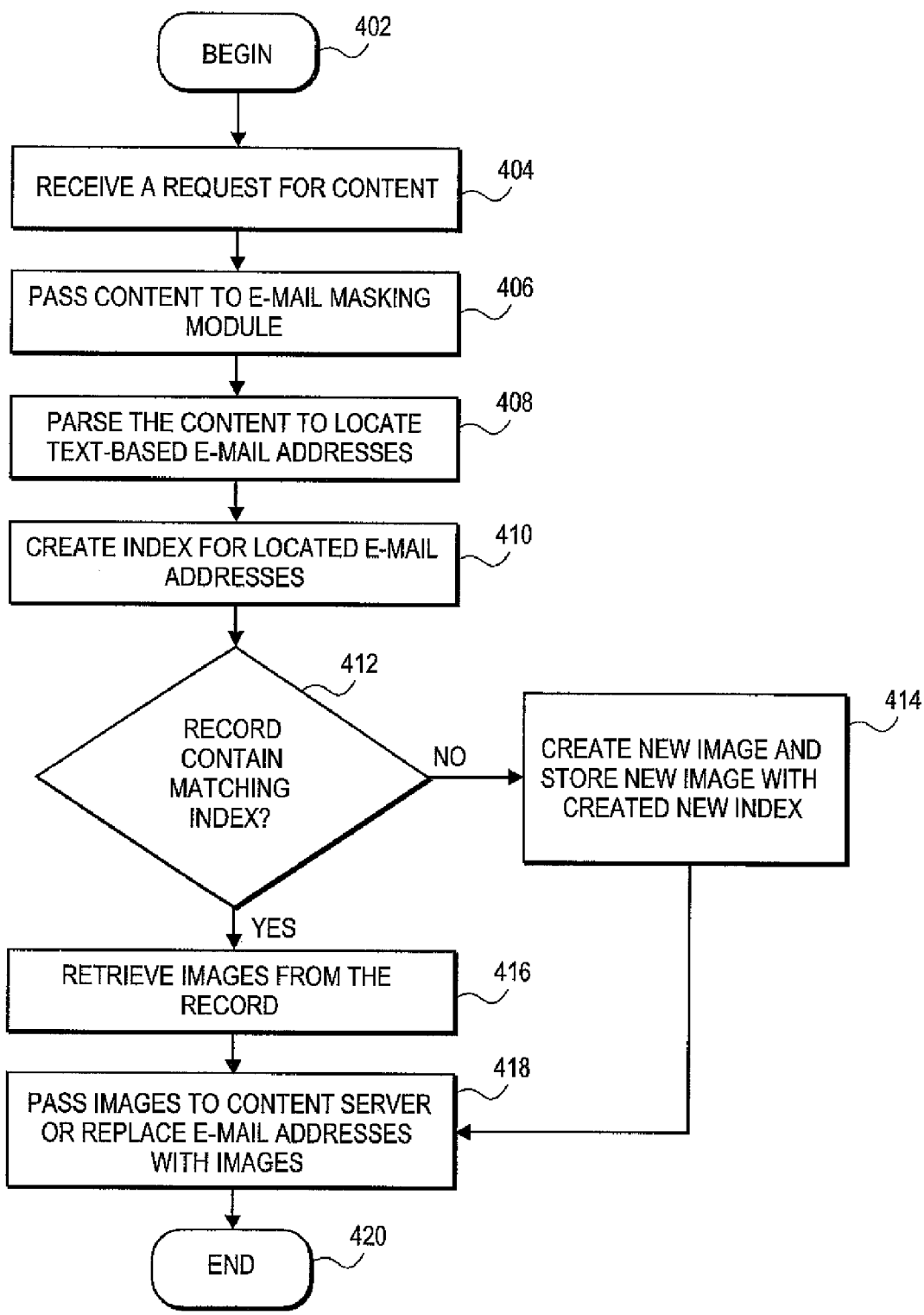
FIG. 4 illustrates a flowchart for overall e-mail protection, according to various embodiments.

FIG. 4 illustrates a flow diagram of overall e-mail masking process, according to embodiments of the present teachings. In 402, processing can begin. In 404, the content server 104 receives a request to provide content. The content can be any type of network based content available in network application such as web pages, chat session, web forums, blogs, and the like. The content server 104 can be configured to retrieve the requested content from a repository, such as a database or a file system. Likewise, the content server 104 can be configured to pass content from one user to another.

Once retrieved or received, in 406, the content server 104 passes the content to the e-mail masking module 110. The e-mail masking module 110 is configured to replace e-mail addresses, contained in the content, with images of the e-mail addresses.

To replace e-mail addresses in the content, in 408, the e-mail masking module 110 parses the content to identify the text-based e-mail addresses. The e-mail masking module 110 searches the retrieved content for a feature common to e-mail addresses, such as the "@" character. The e-mail masking module 110 can maintain a record of the images associated with an index for those e-mail addresses. The index can represent a shortened representation of the e-mail address, for example a hash.

In 410, the e-mail masking module 110 determines an index for the located e-mail addresses in the content. For example, the e-mail masking module 110 can be configured to apply a hash function to the located e-mail addresses. The hashed e-mail address can be the index for the e-mail address.

Once an index has been determined for a located e-mail address, in 412, the e-mail masking module 110 determines if a record of images contains a matching index. The e-mail masking module 110 can be configured to search the record to find a stored index that matches the determined index.

If the e-mail masking module 110 does not find a matching index, in 414, the e-mail masking module 110 creates a new image and new index for the e-mail address and stores the new image associated with the new index. Otherwise, in 416, the e-mail masking module 10 retrieves the image associated with the matching index for each located email address.

Once the e-mail masking module 110 has retrieved the images for the located e-mail addresses in the retrieved content, in 418, the e-mail masking module 110 passes the retrieved images to the content server 104 for replacement of the located email addresses. The e-mail masking module 110 can be configured to replace the located e-mail addresses with the images.

Then, in 420, if the content server 104 receives no further requests, the process can end, but the process can return to any point and repeat.

In the process illustrated in FIG. 4, the images can be retrieved from a record. Likewise, the e-mail masking module 110 can generate the images each time they are requested, without maintaining a record of the images. As such, stages 410-416 can be omitted. If the e-mail masking module does not maintain a record of images, the e-mail masking module 110 can be configured to pass the located e-mail addresses to the image module 122 to generate the images without searching in a record.

In the foregoing and other embodiments, the user making request for content can be a person, customer, subscriber, corporation, organization, or other entity. In embodiments, the user can be or include another content server providing content to other users.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
   determining that content stored in a repository comprises a textual email address;
   hashing, by a processor, the textual email address to generate an index;
   selecting an email address image corresponding to the index from a record of stored email address images; and
   generating a modified copy of the content in which the textual email address has been replaced with the email address image corresponding to the index.

2. The method of claim 1, further comprising retrieving the content from the repository.

3. The method of claim 1, further comprising searching the content for the textual email address to replace based on a feature in the textual email address.

4. The method of claim 1, further comprising retrieving, from the record of stored email address images, the email address image corresponding to the index.

5. The method of claim 1, further comprising:
   creating the email address image; and
   storing, in the record of stored email address images, the email address image corresponding to the index.

6. A system comprising:
   a network interface coupled to at least one network; and
   a content server, communicating with the network interface, the content server being configured to:
   determine that content stored in a repository comprising comprises a textual email address;
   hash the textual email address to generate an index;
   select an email address image corresponding to the index from a record of stored email address images; and
   generate a modified copy of the content in which the textual email address has been replaced with the email address image corresponding to the index.

7. The system of claim 6, wherein the content server is further configured to retrieve the content from the repository.

8. The system of claim 6, wherein the content server is further configured to search the content for the textual email address to replace based on a feature in the textual email address.

9. The system of claim 6, wherein the content server is further configured to retrieve, from the record of stored email address images, the email address image corresponding to the index.

10. The system of claim 6, wherein the content server is further configured to:
    create the email address image; and
    store, in the record of stored email address images, the email address image corresponding to the index.

11. A non-transitory computer readable medium including instructions that, when executed by a processor, cause the processor to perform a method comprising:
    determining that content stored in a repository comprises a textual email address;
    hashing, by a processor, the textual email address to generate an index;
    selecting an email address image corresponding to the index from a record of stored email address images; and
    generating a modified copy of the content in which the textual email address has been replaced with the email address image corresponding to the index.

12. The non-transitory computer readable medium of claim 11, wherein the method further comprises searching the content for the textual email address based on a feature in the textual email address.

13. The non-transitory computer readable medium of claim 11, wherein the method further comprises retrieving from the record of stored email address images the email address image that is associated with the index.

14. The non-transitory computer readable medium of claim 11, the method further comprising:
    creating the email address image; and
    storing, in the record of stored email address images, the email address image corresponding to the index.

* * * * *